US011805452B2

(12) United States Patent
Thantharate et al.

(10) Patent No.: US 11,805,452 B2
(45) Date of Patent: *Oct. 31, 2023

(54) HANDOVER CONTROL IN A WIRELESS USER EQUIPMENT (UE)

(71) Applicant: T-MOBILE INNOVATIONS LLC, Overland Park, KS (US)

(72) Inventors: Anurag Thantharate, Kansas City, MO (US); Sougata Saha, Olathe, KS (US); Sreekar Marupaduga, Overland Park, KS (US); Hannah Jo Sifuentes, Lee's Summit, MO (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,264

(22) Filed: Apr. 18, 2022

(65) Prior Publication Data

US 2022/0248279 A1      Aug. 4, 2022

Related U.S. Application Data

(63) Continuation of application No. 17/153,308, filed on Jan. 20, 2021, now Pat. No. 11,375,417.

(51) Int. Cl.
*H04W 36/00* (2009.01)
*H04W 4/70* (2018.01)
(Continued)

(52) U.S. Cl.
CPC ......... *H04W 36/0072* (2013.01); *H04W 4/70* (2018.02); *H04W 8/24* (2013.01);
(Continued)

(58) Field of Classification Search
CPC ..... H04W 36/0072; H04W 4/70; H04W 8/24; H04W 36/0058; H04W 72/0453;
(Continued)

(56) References Cited

U.S. PATENT DOCUMENTS 9,775,045 B2    9/2017  Li et al.
10,334,446 B2   6/2019  Ashrafi
(Continued)

OTHER PUBLICATIONS

"Discussion on connected mode mobility for IoT over NTN"; 3GPP TSG-RAN WG2 Meeting #113 electronic; Jan. 2021; pp. 1-3; R2-2100166; 3GPP; France.

*Primary Examiner* — Nam T Huynh

(57) ABSTRACT

A wireless User Equipment (UE) uses different handover types for different user applications that are served by different wireless network slices. The wireless UE executes a selected one of the user applications and selects one of the wireless network slices to serve the selected one of the user applications. The wireless UE selects one of the handover types for the selected one of the wireless network slices. The wireless UE wirelessly exchanges application data for the selected one of the user applications with a wireless communication network. The wireless UE and the wireless communication network use the selected one of the handover types for the wireless exchange of the application data. The selected one of the wireless network slices processes the application data in the wireless communication network for the selected one of the user applications.

20 Claims, 10 Drawing Sheets

(51) Int. Cl.
  *H04W 76/11*  (2018.01)
  *H04W 8/24*  (2009.01)
  *H04W 72/0453*  (2023.01)
  *H04W 72/23*  (2023.01)

(52) U.S. Cl.
  CPC ... *H04W 36/0058* (2018.08); *H04W 72/0453* (2013.01); *H04W 72/23* (2023.01); *H04W 76/11* (2018.02)

(58) Field of Classification Search
  CPC . H04W 72/23; H04W 76/11; H04W 36/0055; H04W 36/08; H04W 36/30
  See application file for complete search history.

(56) References Cited

U.S. PATENT DOCUMENTS

| | | |
|---|---|---|
| 10,367,677 B2 | 7/2019 | Parkvall et al. |
| 10,440,555 B2 | 10/2019 | Salkintzis |
| 10,736,028 B2 | 8/2020 | Griot et al. |
| 10,757,576 B2 | 8/2020 | Ashrafi |
| 10,772,101 B2 | 9/2020 | Rong et al. |
| 2018/0124661 A1 | 5/2018 | Tsai |
| 2020/0305054 A1 | 9/2020 | Zee et al. |
| 2021/0014745 A1 | 1/2021 | Padhy et al. |
| 2021/0037455 A1 | 2/2021 | Zhu et al. |

HANDOVER CONTROL IN A WIRELESS USER EQUIPMENT (UE)

RELATED CASES

This U.S. Patent Application is a continuation of U.S. patent application Ser. No. 17/153,308 that was filed on Jan. 20, 2021 and is entitled "HANDOVER CONTROL IN A WIRELESS USER EQUIPMENT (UE)." U.S. patent application Ser. No. 17/153,308 is hereby incorporated by reference into this U.S. Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP).

The CUs are coupled to network elements in the network cores. Exemplary network elements include Access and Mobility Management Functions (AMFs), Session Management Functions (SMFs), and User Plane Functions (UPFs). Some of the UPFs are customized for specific services, and the customized UPFs are implemented in wireless network slices. For example, a UPF may be customized for Ultra-Reliable Low-Latency Communications (URLLC), and the URLLC UPF may comprise a portion of an URLLC slice. Other wireless network slices include enhanced Mobile Broadband (eMBB) slices, massive Machine Type Communication (mMTC) slices, default slices, and backup slices.

To facilitate user mobility, the wireless user devices measure radio metrics for the wireless access nodes and report the metrics to the CUs. The CUs compare the radio metrics to determine when to handover the wireless user devices from one RU to another. A handover type comprises the radio metric that is measured, reported, and processed to determine when the handover occurs. Exemplary handover types include: Signal-to-Interference Plus Noise Ratio (SINR), Reference Signal Received Quality (RSRQ), Reference Signal Received Power (RSRP), and Received Signal Strength (RSS).

Unfortunately, the wireless network slices and the handover types are not efficiently coordinated. The wireless user devices often fail to use the best handover type for a given wireless network slice. Moreover, the wireless user devices fail to optimize handover types for the frequency bands that are used to access the wireless network slices.

TECHNICAL OVERVIEW

A wireless User Equipment (UE) uses different handover types for different user applications that are served by different wireless network slices. The wireless UE executes a selected one of the user applications and selects one of the wireless network slices to serve the selected one of the user applications. The wireless UE selects one of the handover types for the selected one of the wireless network slices. The wireless UE wirelessly exchanges application data for the selected one of the user applications with a wireless communication network. The wireless UE and the wireless communication network use the selected one of the handover types for the wireless exchange of the application data. The selected one of the wireless network slices processes the application data in the wireless communication network for the selected one of the user applications.

DETAILED DESCRIPTION

Figure 1:
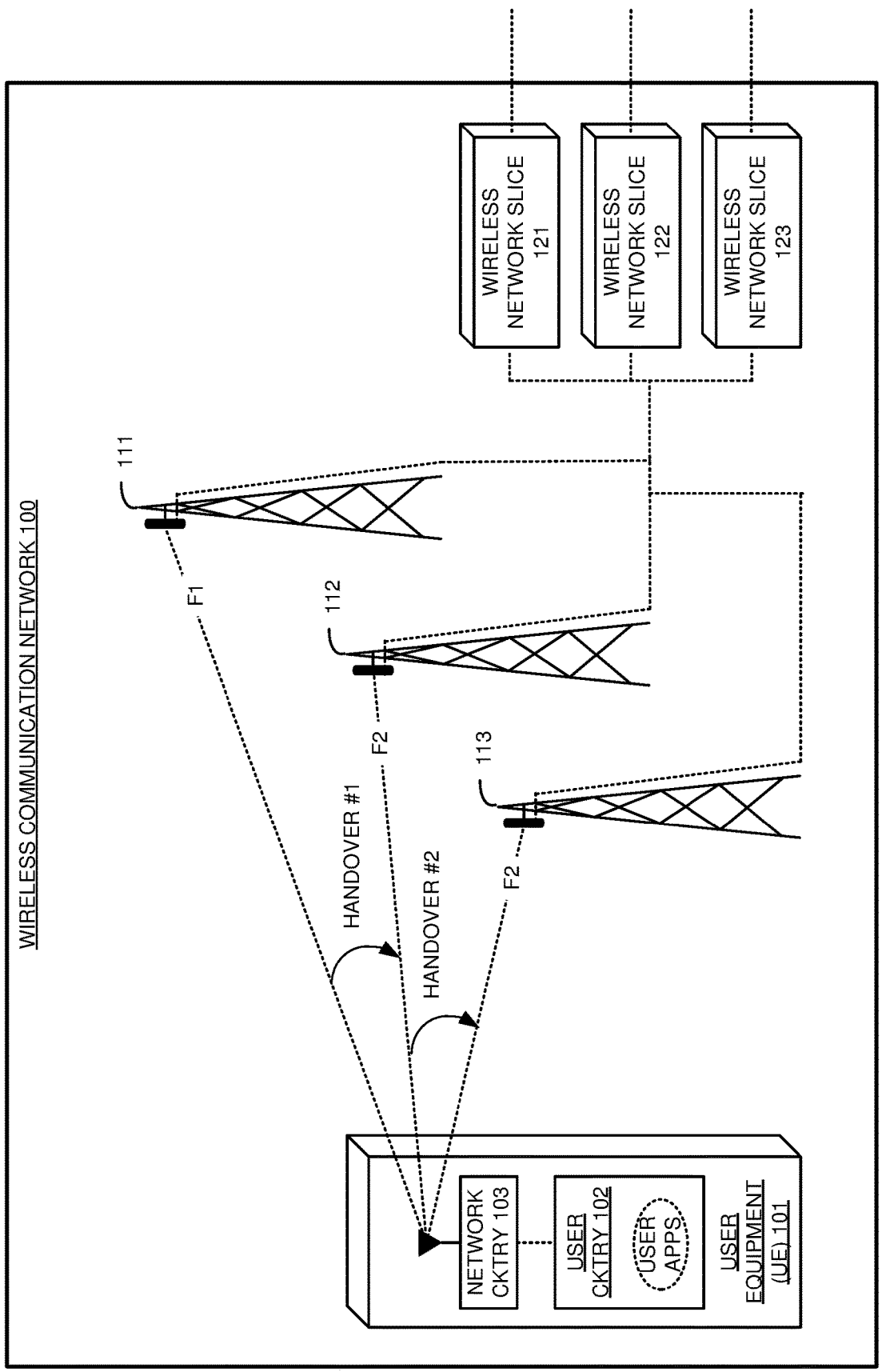
FIG. 1 illustrates a wireless communication network that serves a wireless User Equipment (UE) that controls a handover type for a user application.

FIG. 1 illustrates wireless communication network 100 that serves wireless User Equipment (UE) 101. UE 101 controls a handover type for a user application. Wireless communication network 100 comprises wireless UE 101, wireless access nodes 111-113, and wireless network slices 121-123. UE 101 comprises user circuitry (CKTRY) 102 and network circuitry 103. User circuitry 102 comprises user applications (APPS) like augmented-reality, vehicle-control, atmospheric sensing, or some other user service. Wireless network slices 121-123 may comprise Ultra-Reliable Low-Latency Communication (URLLC) slices, enhanced Mobile Broadband (eMBB) slices, massive Machine Type Communication (mMTC) slices, default slices, backup slices, and/or some other type of network slices. The number of UEs, wireless access nodes, and wireless network slices that are depicted on FIG. 1 has been restricted for clarity, and wireless communication network 100 may comprise many more UEs, nodes, and slices.

UE 101 measures radio metrics for wireless access nodes 111-113 and reports the metrics to the currently serving one of wireless access nodes 111-113. The serving one of access nodes 111-113 compares the radio metrics to determine when to handover UE 101 to the target one of access nodes 111-113. The handover type indicates the radio metric that is measured, reported, and processed to determine when the handover occurs. Exemplary handover types include: Signal-to-Interference Plus Noise Ratio (SINR), Reference Signal Received Quality (RSRQ), Reference Signal Received Power (RSRP), and Received Signal Strength (RSS).

Various examples of network operation and configuration are described herein. In some examples, user circuitry 102 executes a user application and responsively transfers a service request for a corresponding wireless data service to network circuitry 103. Network circuitry 103 wirelessly exchanges signaling with wireless access node 111 over source frequency band (F1) to select wireless network slice 122. Network circuitry 103 identifies a characteristic of wireless network slice 122 like the slice type. Network circuitry 103 selects target frequency band (F2) and a handover type for F2 based on the characteristic of wireless network slice 122. Network circuitry 103 wirelessly exchanges additional signaling with wireless access node 111 to request F2 and the selected handover type. User circuitry 102 and network circuitry 103 exchange data for the user application, and network circuitry 103 wirelessly exchanges the data with wireless access node 112 over F2. Wireless access node 112 and wireless network slice 122 exchange the data to deliver the wireless data service to wireless UE 101 for the user application. Wireless access node 112 uses the selected handover type to handover wireless UE 101 to wireless access node 113. For example, UE 101 may report SINR for wireless access nodes 112-113, and source access node 112 would compare the SINR metrics to determine when to handover UE 101 to target access node 112. After the handover, network circuitry 103 wirelessly exchanges the data with wireless access node 113 over F2. Wireless access node 113 and wireless network slice 122 exchange the data to deliver the wireless data service to wireless UE 101 for the specific user application.

The slice characteristic may comprise the slice type like (URLLC, eMBB, mMTC, default, backup) or some other slice metadata like Quality-of-Service (QoS) levels or security rules. Thus, network circuitry 103 may select the handover type for the target frequency based on the use of URLLC, eMBB, mMTC, default, and backup. In some examples, network circuitry 103 selects a priority of band ranges like (lo>mid>hi). Network circuitry 103 then selects the target frequency band from the available band range with the highest priority for the selected slice characteristic.

Advantageously, UE 101 efficiently coordinates wireless network slices 121-123 with various handover types to use the best handover type for a given wireless network slice. Moreover, UE 101 optimizes handover type for the specific one of the frequency bands (F1-F3) that is used to access wireless network slices 121-123.

UE 101 and wireless access points 111-113 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Wireless access points 111-113 and wireless network slices 121-123 communicate over backhaul links that use metallic links, glass fibers, radio channels, or some other communication media. The backhaul links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 comprises a vehicle, sensor, robot, computer, phone, or some other data appliance with wireless communication circuitry. Wireless access nodes 111-113 are depicted as towers but nodes 111-113 may use other mounting structures or no mounting structure at all. Wireless access nodes 111-113 may comprise gNodeBs, eNodeBs, NB-IoT access nodes, LP-WAN base stations, wireless relays, and/or some other wireless network transceivers. UE 101 and wireless access nodes 111-113 comprise antennas, amplifiers, filters, modulation, and analog/digital interfaces. UE 101, wireless access nodes 111-113, and wireless network slices 121-123 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein. In some examples, wireless network slices 121-123 comprise User Plane Functions (UPFs), Gateways (GWs), and/or other network elements that are hosted by a Network Function Virtualization Infrastructure (NFVI).

Figure 2:
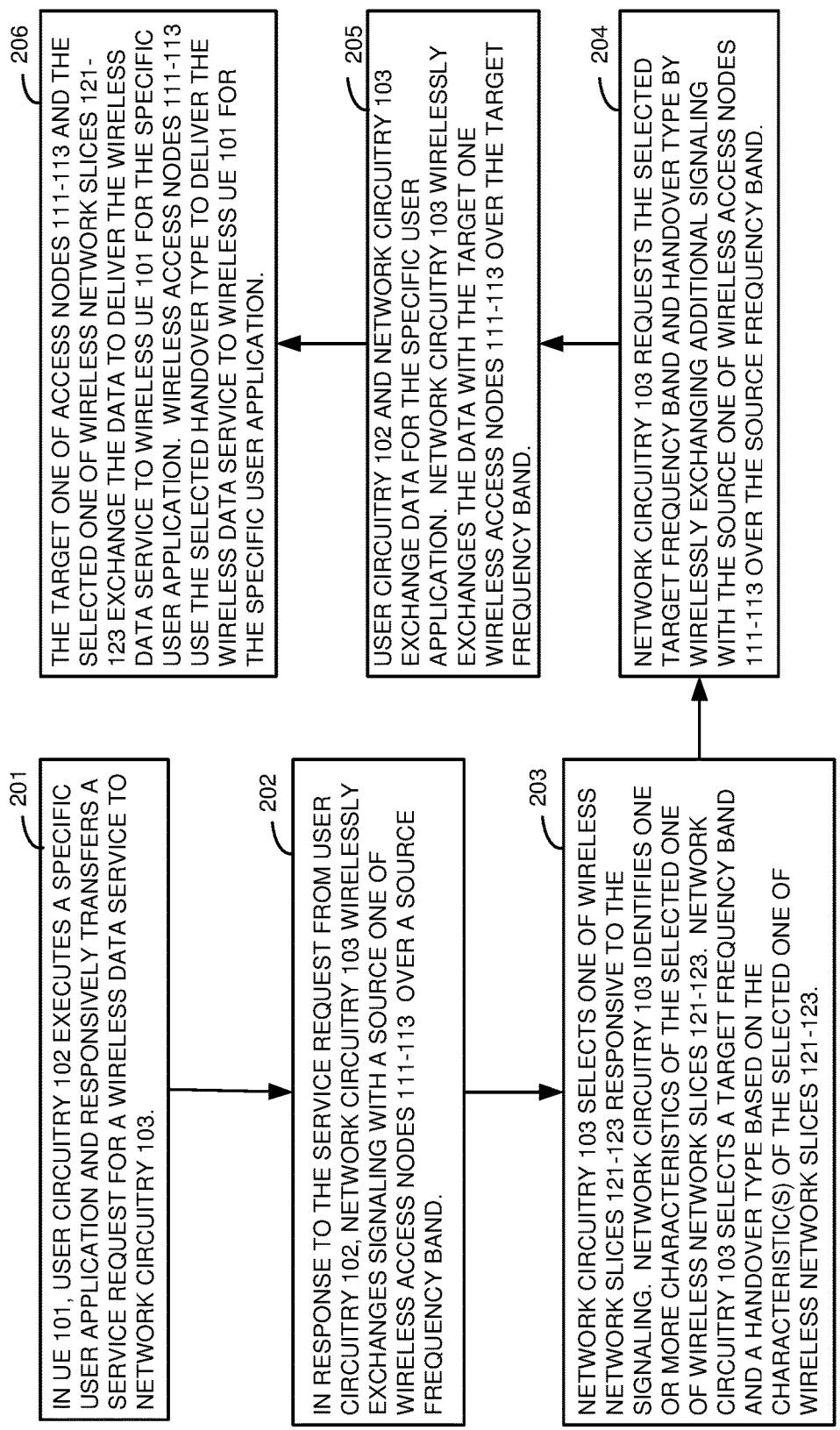
FIG. 2 illustrates the operation of the wireless communication network and the wireless UE to control the handover type for the user application.

FIG. 2 illustrates the operation of wireless communication network 100 and wireless UE 101 to control the handover type for the user application. The operation is exemplary and may vary in other examples. In UE 101, user circuitry 102 executes a specific user application and responsively transfers a service request for a corresponding wireless data service to network circuitry 103 (201). In response to the service request from user circuitry 102, network circuitry 103 wirelessly exchanges signaling with a source one of wireless access nodes 111-113 over a source frequency band (202). Network circuitry 103 selects one of wireless network slices 121-123 responsive to the signaling (203). Network circuitry 103 identifies one or more characteristics of the selected one of wireless network slices 121-123 (203). Network circuitry 103 selects a target frequency band and a handover type based on the characteristic(s) of the selected one of wireless network slices 121-123 (203). Network circuitry 103 requests the selected target frequency band and the handover type by wirelessly exchanging additional signaling with the source one of wireless access nodes 111-113 over the source frequency band (204). User circuitry 102 and network circuitry 103 exchange data for the specific user application (205). Network circuitry 103 wirelessly exchanges the data with the target one of wireless access nodes 111-113 over the target frequency band (205). The target one of wireless access nodes 111-113 and the selected one of wireless network slices 121-123 exchange the data to deliver the wireless data service to wireless UE 101 for the specific user application. Wireless access nodes 111-113 use the selected handover type to handover wireless UE 101 when delivering the wireless data service for the specific user application (206).

Figure 3:
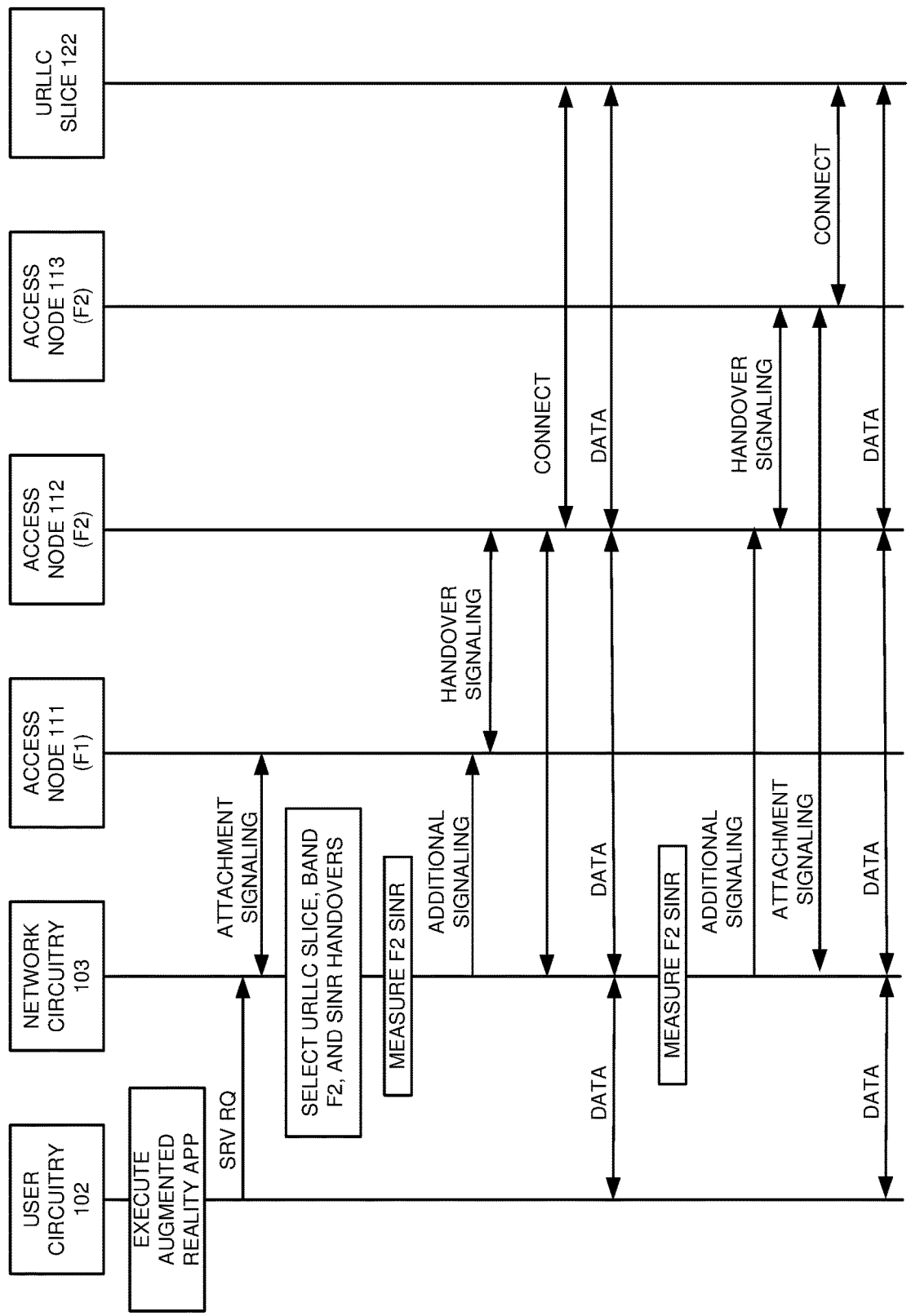
FIG. 3 illustrates the operation of the wireless communication network and the wireless UE to control the handover type for the user application.

FIG. 3 illustrates the operation of wireless communication network 100 and wireless UE 101 to control the handover type for the user application. The operation is exemplary and may vary in other examples. In this example, wireless network slice 122 comprises URLLC slice 122, although slice 122 may comprise another slice type in another example. In this example, UE 101 executes an augmented-reality application that requires a low-latency service, although other user applications with different service requirements could be used in other examples. In this example, UE 101 selects the target frequency band and the handover type based on the slice type, although other slice characteristics could be used to select the frequency band and/or the handover type in other examples.

In UE 101, user circuitry 102 executes the augmented reality application and responsively transfers a service request (SRV RQ) for a low-latency wireless data service to network circuitry 103. Based on received signal strength or some other factor, network circuitry 103 wirelessly attaches to and exchanges attachment signaling with source wireless access node 111 over F1. The attachment signaling from UE 101 to wireless access node 111 reports a UE capability for the URLLC slice type. Wireless access node 111 has network 100 select and authorizes URLLC slice 122 for UE 101 based on the reported UE capability. The attachment signaling from wireless access node 111 to UE 101 indicates authorized URLLC slice 122. Network circuitry 103 then selects URLLC slice 122 for UE 101 responsive to the authorization.

Network circuitry 103 selects F2 and the SINR handover type based on the URLLC slice type—although other handover types could be used for the URLLC slice type on other examples. Network circuitry 103 measures the SINR over F2 for wireless access nodes 112-113. Network circuitry 103 wirelessly exchanges additional signaling with source wireless access node 111. The additional signaling from network circuitry 103 to access node 111 requests the SINR handover type, requests cell-reselection to F2, and includes an F2 SINR report for wireless access nodes 112-113. Wireless access node 111 selects wireless access node 112 over node 113 based on better F2 SINR. Wireless access nodes 111-112 exchange handover signaling to handover UE 101, and in response, network circuitry 103 wirelessly exchanges attachment signaling with wireless access node 112 over F2. Wireless access node 112 connects UE 101 to selected URLLC slice 122. User circuitry 102 and network circuitry 103 exchange data for the augmented reality user application. Network circuitry 103 wirelessly exchanges the data with wireless access node 112 over F2. Wireless access node 112 exchanges the data with selected URLLC slice 122 which delivers the low-latency data service to wireless UE 101 for the augmented reality application.

Network circuitry 103 measures F2 SINR for wireless access nodes 112-113. Network circuitry 103 wirelessly exchanges additional signaling with wireless access node 112 over F2. The additional signaling from UE 101 to wireless access node 112 includes an F2 SINR report for wireless access nodes 112-113. Possibly due to UE mobility, wireless access node 112 selects wireless access node 113 for UE 101 based on better SINR. Wireless access nodes 112-113 exchange handover signaling to handover UE 101, and in response, network circuitry 103 wirelessly exchanges attachment signaling with wireless access node 113 over F2. Wireless access node 113 connects UE 101 to selected URLLC slice 122. User circuitry 102 and network circuitry 103 exchange data for the augmented reality application. Network circuitry 103 wirelessly exchanges the data with wireless access node 113 over F2. Wireless access node 113 exchanges the data with selected URLLC slice 122 which delivers the low-latency data service to wireless UE 101 for the augmented reality user application. Wireless access node 113 and UE 101 will use SINR handovers for the URLLC slice.

Figure 4:
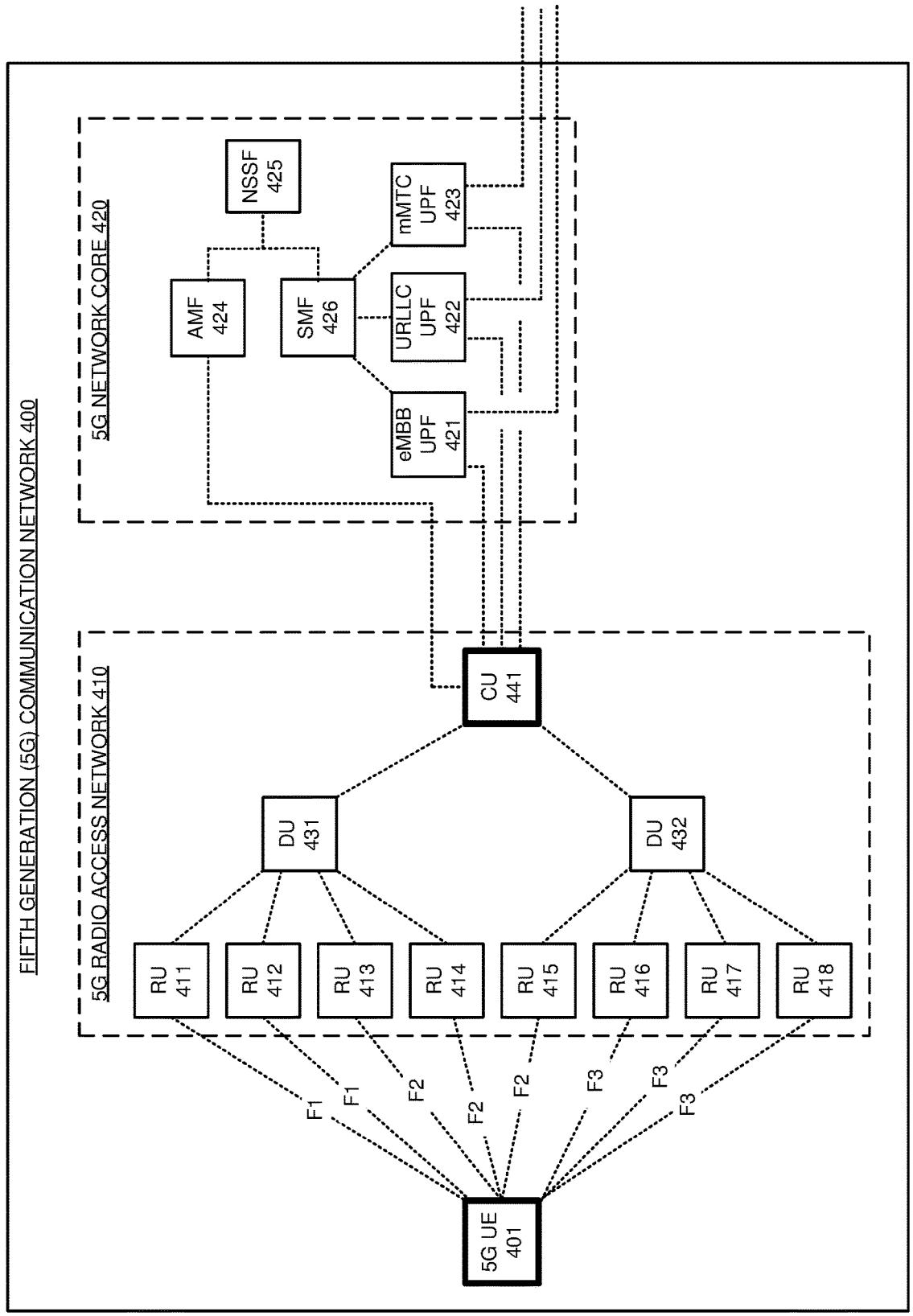
FIG. 4 illustrates a Fifth Generation (5G) communication network that serves a 5G User Equipment (UE) that controls handover types for user applications.

FIG. 4 illustrates Fifth Generation (5G) communication network 400 that serves 5G User Equipment (UE) 401 to control handover types for user applications. 5G communication network 400 comprises an example of wireless communication network 100, although network 100 may differ. 5G communication network 400 comprises 5G UE 401, 5G Radio Access Network (RAN) 110, and 5G network core 420. 5G RAN 410 comprises Radio Units (RUs) 411-418, Distributed Units 431-432, and Centralized Unit (CU) 441. 5G network core comprises eMBB User Plane Function (UPF) 421, URLLC UPF 422, mMTC UPF 423, Access and Mobility Management Function (AMF) 424, Network Slice Selection Function (NSSF) 425, and Session Management Function (SMF) 426. Other network functions are typically present but are omitted for clarity. RUs 411-412 use a first frequency band (F1) that is a few hundred megahertz wide. RUs 413-415 use a second frequency band (F2) that is several hundred megahertz wide. RUs 416-418 use a third frequency band (F3) that is a few thousand megahertz wide.

Based on signal strength, UE 401 wirelessly attaches to RU 411 over F1 and exchanges attachment signaling with CU 441 over RU 411 and DU 431. UE 401 reports UE capabilities for frequency bands F1-F3 and for eMBB, URLLC, and mMTC slices to AMF 424 over RU 411, DU 431, and CU 441. AMF 424 authorizes bands F1-F3 for UE 401 responsive to the UE capability report. AMF 424 interacts with NSSF 425 to authorize UE 401 for the eMBB, URLLC, and mMTC slices responsive to the UE capability report. AMF 424 indicates authorized F1-F3 bands and authorized eMBB, URLLC, and mMTC slices to UE 401 over CU 441, DU 431, and RU 411.

UE 401 executes an augmented reality application and selects the authorized URLLC slice. In response to selecting the URLLC slice, UE 401 selects F3 and SINR handovers by translating the URLLC slice type through a data structure into the F3 frequency band and SINR handover type. UE 401 measures the F3 SINR of RUs 416-418 and transfers a cell reselection request to F3. CU 441 selects RU 418 based on the best F3 SINR. CU 441 directs UE 401 to attach to RU 418 over F3 and controls RU 418 and DU 432 to serve UE 401 over F3. CU 441 notifies AMF 424 of the cell reselection to F3 and RU 418. UE 401 attaches to CU 441 over RU 418 and DU 432. Over RU 418, DU 432, and CU 441, UE 401 instructs SMF 426 to activate the authorized URLLC slice. In response, SMF 426 selects URLLC bearer QoS and addressing for UE 401. SMF 426 selects and controls URLLC UPF 422 to serve the URLLC bearer to CU 441 per the QoS and addressing. AMF 424 controls CU 441 to serve the URLLC bearer between UE 401 and URLLC UPF 422 over F3, RU 418, and DU 432 using SINR handovers. CU 441 signals DU 432 and RU 418 to deliver the URLLC bearer over F3 per the URLLC QoS and addressing. CU 441 signals UE 401 over DU 432 and RU 418 to use the URLLC bearer over F3 and to use SINR handovers for the URLLC slice. UE 401 and URLLC UPF 422 now exchange user data over F3, RU 418, DU 432, and CU 441. CU 441 and UE 401 perform SINR handovers for the URLLC slice.

UE 401 executes a video-conferencing application and selects the authorized eMBB slice. In response to selecting the eMBB slice, UE 401 selects F2 and SINR handovers by translating the eMBB slice type through a data structure into the F2 frequency band and SINR handover type. UE 401 measures the F2 SINR of RUs 413-415. Over RU 418 and DU 432, UE 401 transfers a cell addition request for F2 and an F2 SINR report to CU 441. CU 441 selects RU 415 based on the best F2 SINR and directs UE 401 to attach to RU 415 over F2. CU 441 controls RU 415 and DU 432 to serve UE 401 over F2. CU 441 notifies AMF 424 of the cell addition of RU 415 over F2. UE 401 attaches to CU 441 over RU 415 and DU 432. Over RU 415, DU 432, and CU 441, UE 401 instructs SMF 426 to activate the authorized eMBB slice. In response, SMF 426 selects eMBB bearer QoS and addressing for UE 401. SMF 426 selects and controls eMBB UPF 421 to serve the eMBB bearer to CU 441 per the eMBB QoS and addressing. AMF 424 controls CU 441 to serve the eMBB bearer between UE 401 and eMBB UPF 421 over F2, RU 415, and DU 432 using SINR handovers. CU 441 signals DU 432 and RU 415 to deliver the eMBB bearer over F2 per the eMBB QoS and addressing. CU 441 signals UE 401 over DU 432 and RU 418 to use the eMBB bearer over F2 and to use SINR handovers over the eMBB slice. UE 401 and eMBB UPF 421 now exchange user data over F2, RU 415, DU 432, and CU 441. CU 441 and UE 401 perform SINR handovers for the eMBB slice.

UE 401 executes an atmospheric sensor application and selects the authorized mMTC slice. In response to selecting the mMTC slice, UE 401 selects F1 and RSRP handovers by translating the mMTC slice type through a data structure into the F1 frequency band and RSRP handover type. UE 401 measures the F1 RSRP of RUs 411-412. Over RU 415 and DU 432, UE 401 transfers a cell addition request for F1 to CU 441. CU 441 selects RU 412 based on the best F1 RSRP and directs UE 401 to attach to RU 412 over F1. CU 441 controls RU 412 and DU 431 to serve UE 401 over F1. CU 441 notifies AMF 424 of the cell addition of RU 412 over F1. Over F2, RU 412, DU 431, and CU 441, UE 401 instructs SMF 426 to activate the authorized mMTC slice. In response, SMF 426 selects mMTC bearer QoS and addressing for UE 401. SMF 426 selects and controls mMTC UPF 423 to serve the mMTC bearer to CU 441 per the mMTC QoS and addressing. AMF 424 controls CU 441 to serve the mMTC bearer between UE 401 and mMTC UPF 423 over F1, RU 412, and DU 431 using RSRP handovers. CU 441 signals DU 431 and RU 412 to deliver the mMTC bearer over F1 per the mMTC QoS and addressing. CU 441 signals UE 401 over DU 431 and RU 415 to use the mMTC bearer over F1 and to use RSRP handovers for the mMTC slice. UE 401 and mMTC UPF 423 now exchange user data over F1, RU 412, DU 431, and CU 441. CU 441 and UE 401 perform RSRP handovers for the mMTC slice.

As UE 401 moves about, UE 401 and CU 441 may perform SINR handovers for the URLLC slice over F3 from RU 418 to RUs 416-417 (or another RU or band). UE 401 and CU 441 may perform SINR handovers for the eMBB slice over F2 from RU 415 to RU 413-414 (or another RU or band). UE 401 and CU 441 may perform RSRP handovers for the mMTC slice over F1 from RU 412 to RU 411 (or another RU or band).

Figure 5:
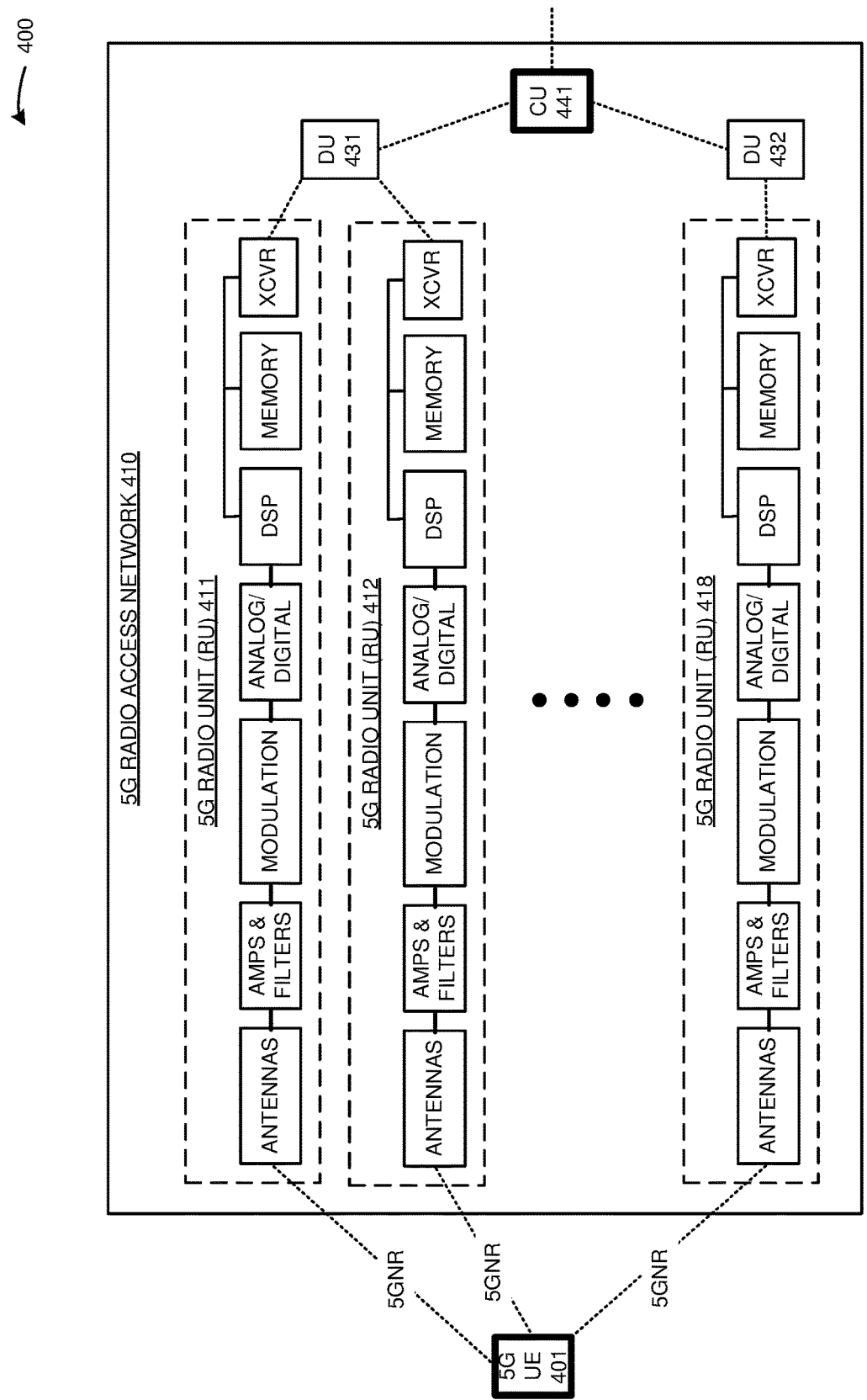
FIG. 5 illustrates 5G Radio Units (RUs) that serve the 5G UE that controls handover types for user applications.

FIG. 5 illustrates 5G Radio Units (RUs) 411-418 that serve 5G UE 401 which controls handover types for user applications. RUs 411-418 comprise an example of wireless access nodes 111-113, although nodes 111-113 may differ. RUs 411-418 comprise antennas, amplifiers, filters, modulation, analog-to-digital interfaces, DSP, memory, and transceivers (XCVRs) that are coupled over bus circuitry. UE 401 is wirelessly coupled to the antennas in RUs 411-418 over 5GNR links using respective frequency bands F1-F3. RUs 411-412 use F1. RUs 413-415 use F2. RUs 416-418 use F3. Transceivers in RUs 411-418 are coupled to transceivers in DUs 431-432 over fronthaul links like enhanced Common Public Radio Interface (eCPRI). The DSP in RUs 411-418 execute their operating systems and radio applications to exchange 5GNR signals with UE 401 and to exchange 5GNR data units with DUs 431-432.

For the uplink, the antennas receive wireless signals from UE 401 transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies (F1-F3). The analog/digital interfaces convert the demodulated analog signals into digital signals for the DSP. The DSP transfers corresponding 5GNR symbols to DUs 431-432 over the transceivers.

For the downlink, the DSP receives downlink 5GNR symbols from DUs 431-432. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies F1-F3. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data.

Figure 6:
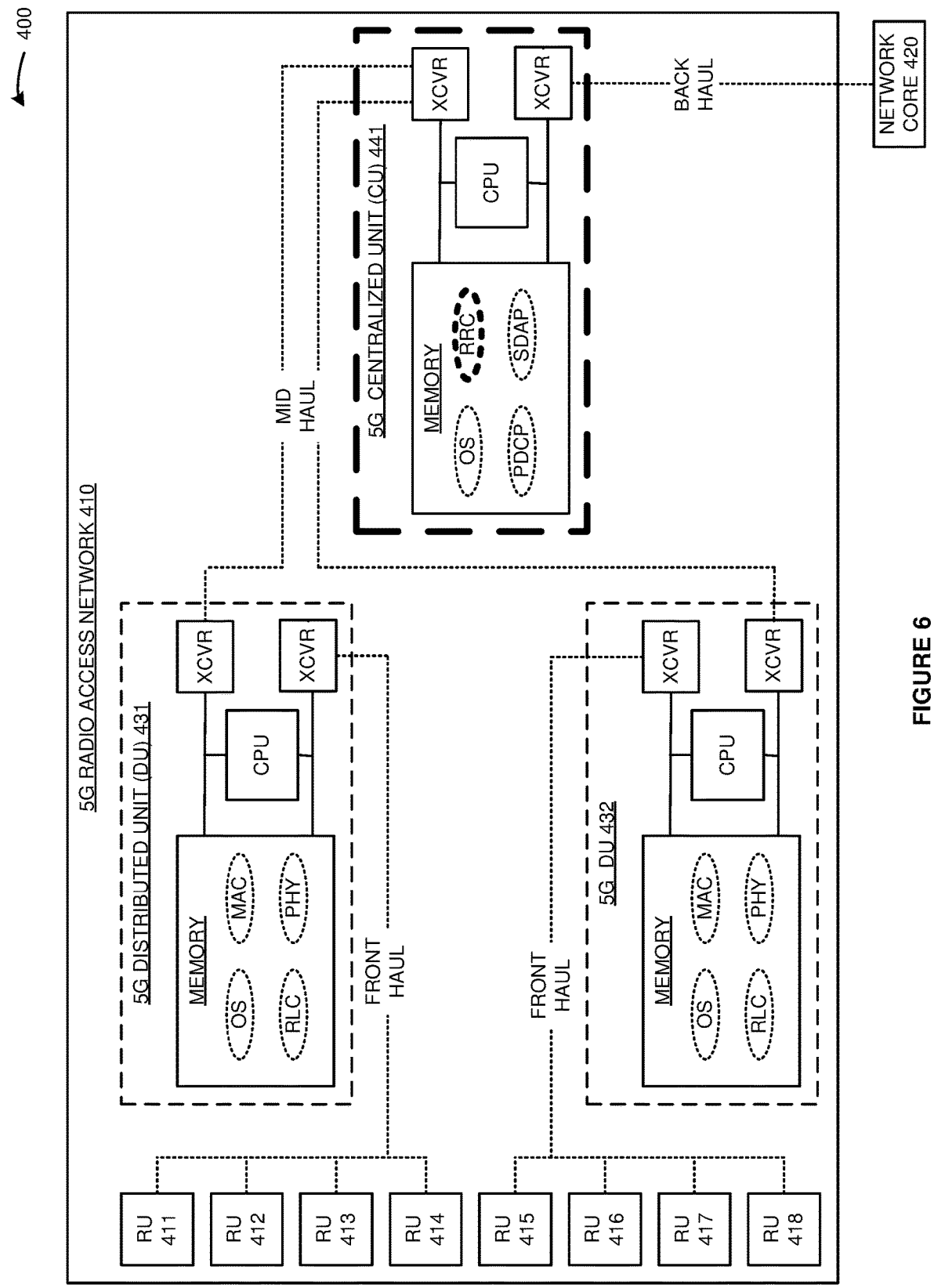
FIG. 6 illustrates 5G Distributed Units (DUs) and a 5G Centralized Unit (CU) that serve the 5G UE that controls handover types for user applications.

FIG. 6 illustrates 5G Distributed Units (DUs) 431-432 and 5G Centralized Unit (CU) 441 that serve 5G UE 401 which controls handover types for user applications. DUs 431-432 and CU 441 comprise an example of wireless access nodes 111-113, although nodes 111-113 may differ. DUs 431-432 comprise memory, CPU, and transceivers that are coupled over bus circuitry. The memories in DUs 431-432 store operating systems and 5GNR network applications like Physical Layer (PHY), Media Access Control (MAC), and Radio Link Control (RLC). CU 441 comprises memory, CPU, and transceivers that are coupled over bus circuitry. The memory in CU 441 stores an operating system and network applications like Packet Data Convergence Protocol (PDCP), Service Data Adaptation Protocol (SDAP), and Radio Resource Control (RRC). Transceivers in DUs 431-432 are coupled to transceivers in RUs 411-418 over front-haul links. Transceivers in DUs 431-432 are coupled to transceivers in CU 441 over mid-haul links. Transceivers in CU 441 are coupled to network core 420 over backhaul links.

RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, guard-insertion/guard-deletion, parsing/de-parsing, control insertion/removal, interleaving/ de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

The RRC in CU exchanges attachment signaling with the RRC in UE 401 over RU 411 and DU 431. The RRC in UE 401 reports UE capabilities for bands F1-F3 and for eMBB, URLLC, and mMTC slices to AMF 424 through the N1 over RU 411, DU 431, and CU 441. AMF 424 indicates authorized F1-F3 bands and authorized eMBB, URLLC, and mMTC slices to UE 401 over the N1 though CU 441, DU 431, and RU 411. AMF 424 indicates authorized F1-F3 bands and authorized eMBB, URLLC, and mMTC slices to the RRC in CU 441 over the N2.

The RRC in CU 441 receives a cell reselection request to F3, SINR handovers on F3, and an F3 SINR report from the RRC in UE 401 over RU 411 and DU 431. Based on the authorization from AMF 424 and the report, the RRC in CU 441 selects RU 418 and directs the RRC in UE 401 to attach to RU 418 over F3. The RRC in CU 441 controls RU 418 and DU 432 to serve UE 401 over F3. The RRC in CU 441 notifies AMF 424 of the cell reselection to F3 and RU 418. The RRC in UE 401 now communicates with the RRC in CU 441 over RU 418 and DU 432. Over the N1 through RU 418, DU 432, and CU 441, UE 401 instructs SMF 426 to activate the authorized URLLC slice. AMF 424 signals the RRC in CU 441 over the N2 to serve the URLLC bearer between UE 401 and URLLC UPF 422 over F3, RU 418, and DU 432 using SINR handovers. The RRC in CU 441 signals the applications in DU 432 and RU 418 to deliver the URLLC bearer over F3 per the URLLC QoS and addressing. The RRC in CU 441 signals the RRC in UE 401 over DU 432 and RU 418 to use the URLLC bearer over F3 and to use SINR handovers. The SDAP in UE 401 and URLLC UPF 422 now exchange URLLC user data over F3, RU 418, DU 432, and CU 441. The RRC in CU 441 and the RRC in UE 401 perform SINR handovers for the URLLC slice.

The RRC in CU 441 receives a cell addition request for F2, SINR handovers over F2, and an F2 SINR report from the RRC in UE 401 over RU 418 and DU 432. Based on the authorization from AMF 424 and the F2 report, the RRC in CU 441 selects RU 415 and directs the RRC in UE 401 to attach to RU 415 over F2. The RRC in CU 441 controls RU 415 and DU 432 to serve UE 401 over F2. The RRC in CU 441 notifies AMF 424 of the cell addition of RU 415 over F2. The RRC in UE 401 may now communicate with the RRC in CU 441 over RU 415 and DU 432. Over the N1 through RU 415, DU 432, and CU 441, UE 401 instructs SMF 426 to activate the authorized eMBB slice. AMF 424 signals the RRC in CU 441 over the N2 to serve the eMBB bearer between UE 401 and eMBB UPF 421 over F2, RU 415, and DU 432 using SINR handovers. The RRC in CU 441 signals the applications in DU 432 and RU 415 to deliver the eMBB bearer over F2 per the eMBB QoS and addressing. The RRC in CU 441 signals the RRC in UE 401 over DU 432 and RU 415 to use the eMBB bearer over F2 and to use SINR handovers. The SDAP in UE 401 and eMBB UPF 421 now exchange eMBB user data over F2, RU 415, DU 432, and CU 441. The RRC in CU 441 and the RRC in UE 401 perform SINR handovers for the eMBB slice.

The RRC in CU 441 receives another cell addition request for F1, RSRP handovers over F1, and an F1 RSRP report from the RRC in UE 401 over RU 415 and DU 432. Based on the authorization from AMF 424 and the F1 report, the RRC in CU 441 selects RU 412 and directs the RRC in UE 401 to attach to RU 412 over F1. The RRC in CU 441 controls RU 412 and DU 431 to serve UE 401 over F1. The RRC in CU 441 notifies AMF 424 of the cell addition of RU 412 over F1. The RRC in UE 401 may now communicate with the RRC in CU 441 over RU 412 and DU 431. Over the N1 through RU 412, DU 431, and CU 441, UE 401 instructs SMF 426 to activate the authorized mMTC slice. AMF 424 signals the RRC in CU 441 over the N2 to serve the mMTC bearer between UE 401 and mMTC UPF 423 over F1, RU 412, and DU 431 using RSRP handovers. The RRC in CU 441 signals the applications in DU 431 and RU 412 to deliver the mMTC bearer over F1 per the mMTC QoS and addressing. The RRC in CU 441 signals the RRC in UE 401 over DU 431 and RU 412 to use the mMTC bearer over F1 and to use RSRP handovers for the mMTC slice. The SDAP in UE 401 and mMTC UPF 423 now exchange mMTC user data over F1, RU 412, DU 431, and CU 441. The RRC in CU 441 and the RRC in UE 401 perform RSRP handovers for the mMTC slice.

As UE 401 moves about, the RRC in UE 401 and the RRC in CU 441 may perform SINR handovers for the URLLC slice over F3 from RU 418 to RUs 416-417 (or another RU or band). The RRC in UE 401 and the RRC in CU 441 may perform SINR handovers for the eMBB slice over F2 from RU 415 to RU 413-414 (or another RU or band). The RRC in UE 401 and the RRC in CU 441 may perform RSRP handovers for the mMTC slice over F1 from RU 412 to RU 411 (or another RU or band).

Figure 7:
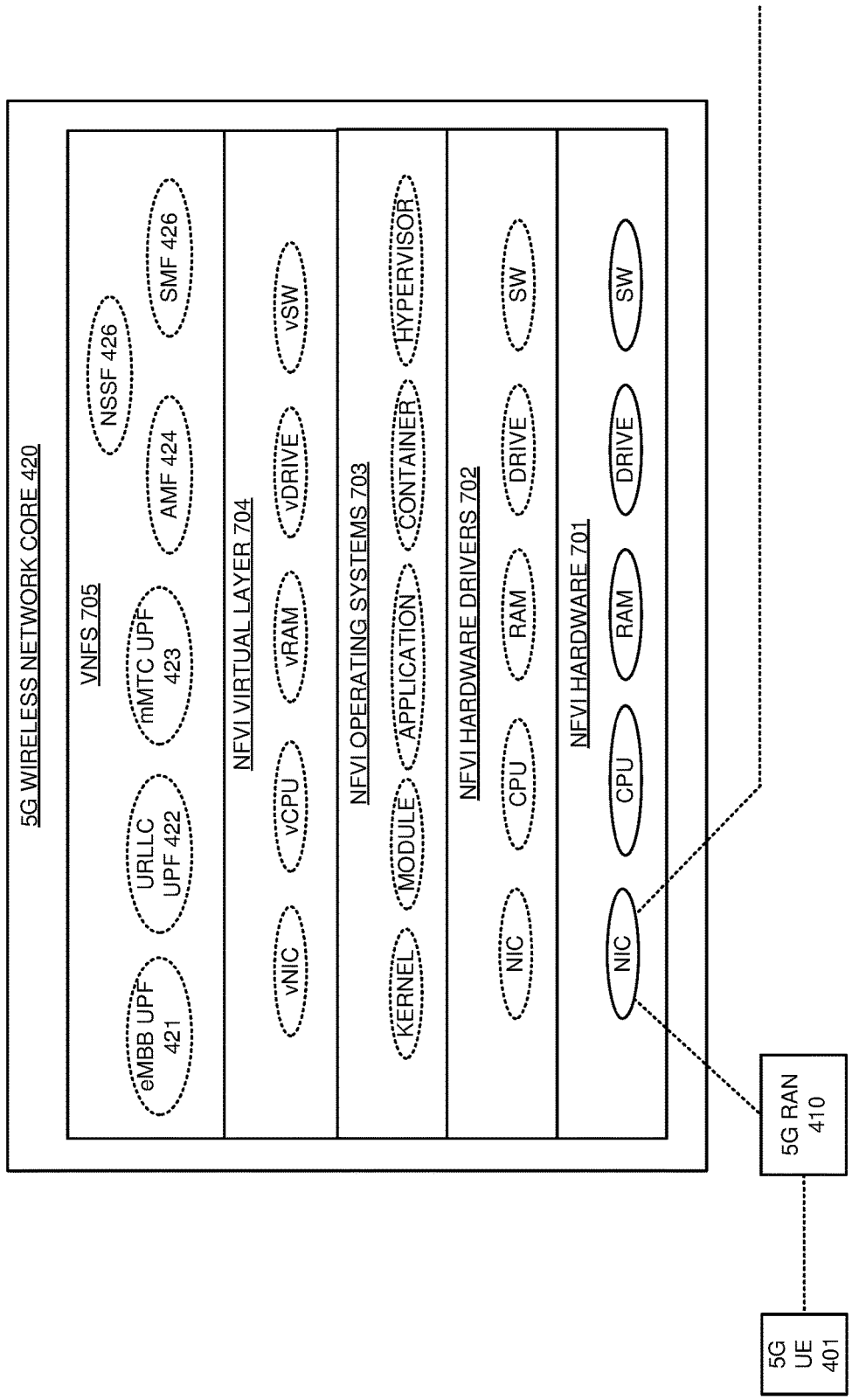
FIG. 7 illustrates a 5G wireless network core that serves the 5G UE that controls handover types for user applications.

FIG. 7 illustrates 5G wireless network core 420 that serves 5G UE 401 which controls handover types for user applications. Wireless network core 420 comprises an example of network core 120, although core 120 may differ. Wireless network core 420 comprises Network Function Virtualization Infrastructure (NFVI) hardware 601, NFVI hardware drivers 602, NFVI operating systems 603, NFVI virtual layer 604, and NFVI Virtual Network Functions (VNFs) 605. NFVI hardware 601 comprises Network Interface Cards (NICs), CPU, RAM, Flash/Disk Drives (DRIVE), and Data Switches (SW). NFVI hardware drivers 602 comprise software that is resident in the NIC, CPU, RAM, DRIVE, and SW. NFVI operating systems 603 comprise kernels, modules, applications, containers, hypervisors, and the like. NFVI virtual layer 604 comprises vNIC, vCPU, vRAM, vDRIVE, and vSW. NFVI VNFs 605 comprise eMBB UPF 421, URLLC UPF 422, mMTC UPF 423, AMF 424, NSSF 425, and SMF 426. Other VNFs like Authentication Server Function (AUSF), Unified Data Manager (UDM), Network Exposure Function (NEF), Policy Control Function (PCF) are typically present but are omitted for clarity. Wireless network core 420 may be located at a single site or be distributed across multiple geographic locations. The NIC are coupled to CU 441 in 5G RAN 410 and to external systems. NFVI hardware 601 executes NFVI hardware drivers 602, NFVI operating systems 603, NFVI virtual layer 604, and NFVI VNFs 605 to serve UE 401 over 5G RAN 410.

Figure 8:
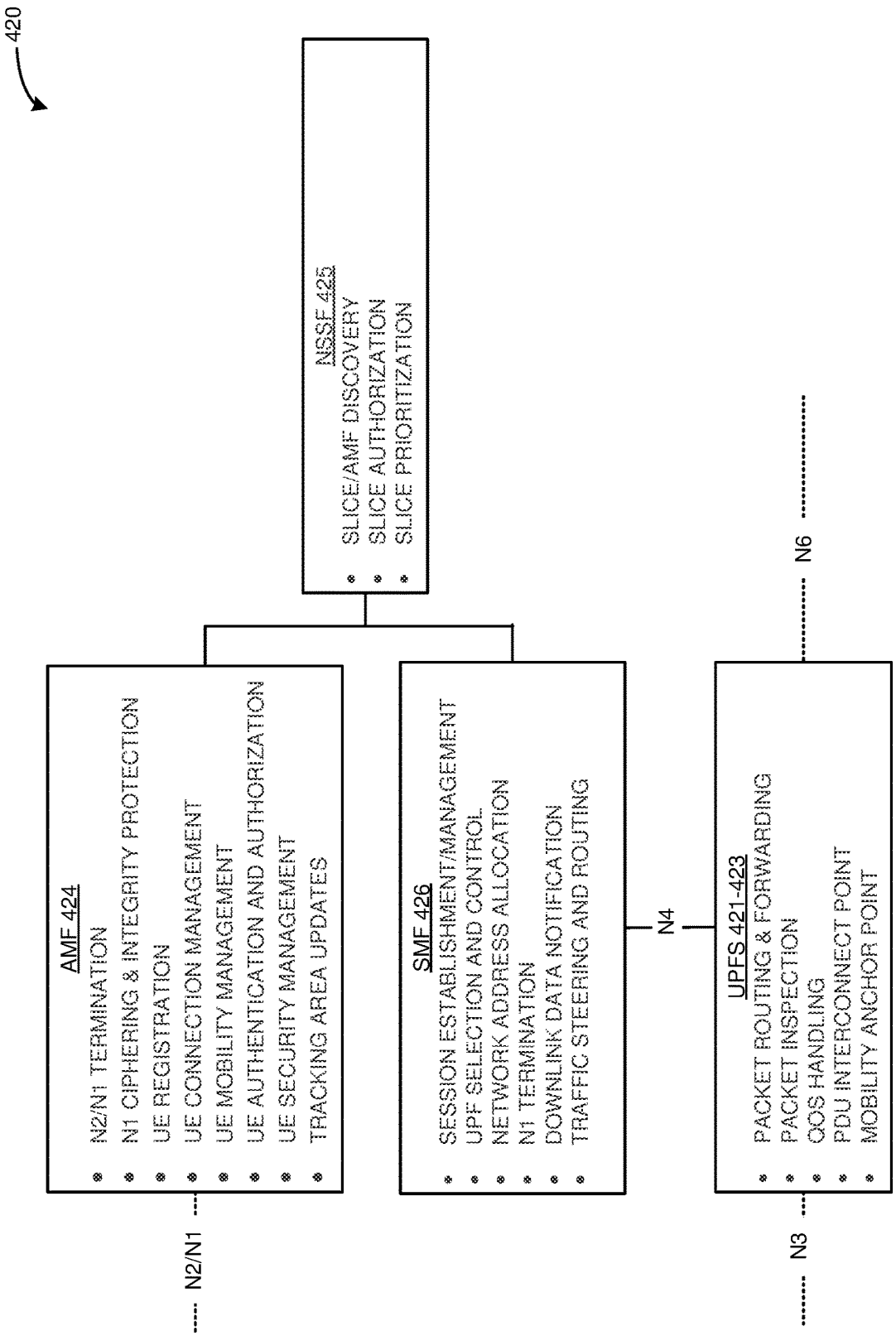
FIG. 8 illustrates the 5G wireless network core that serves the 5G UE that controls handover types for user applications.

FIG. 8 further illustrates 5G wireless network core 420 that serves 5G UE 401 which controls handover types for user applications. UPFs 421-423 perform packet routing & forwarding, packet inspection, QoS handling PDU interconnection, and mobility anchoring. AMF 424 performs N2/N1 termination, N1 ciphering & integrity protection, UE registration, SMF/PCF selection, UP, connection/mobility management, UE authentication and authorization, UE security management, and tracking area updates. NSSF 425 performs slice discovery, AMP discovery, slice authorization, and slice prioritization. SWF 426 performs session establishment/management, network address allocation, N1 termination, downlink data notification, and traffic steering and routing. Although not shown for clarity, an Authentication Server Function (AUSF) performs UP authentication with Authentication and Key Agreement (AKA) credentials and handles UE authorizations. A User Data Management (UDM) handles UE context, UE subscription data, and LIE authentication keys. A Network Repository Function (NRF) performs network function authentication and authorization, selection, security, and event registration/subscriptions. A Policy Control Function (PCF) distributes UP policies to the control plane.

In operation, UE 401 reports UE capabilities for bands F1-F3 and for eMBB, URLLC, and mMTC slices to AMF 424 over CU 441. AMF 424 interacts with the AUSF and UDM to authorize UE 401 for the F1-F3 bands. AMF 424 interacts with NSSF 425 to authorize UE 401 for the eMBB, URLLC, and mMTC slices. AMF 424 indicates authorized F1-F3 bands and authorized eMBB, URLLC, and mMTC slices to UE 401 over CU 441.

CU 441 notifies AMF 424 over N2 of the cell reselection to RU 418 over F3 for UE 401. Over the N1, UE 401 instructs SMF 426 to activate the authorized URLLC slice. In response, SMF 426 selects URLLC bearer QoS and addressing for UE 401. SMF 426 selects and controls URLLC UPF 422 to serve the URLLC bearer to CU 441 per the QoS and addressing. AMF 424 controls CU 441 to serve the URLLC bearer between UE 401 and URLLC UPF 422 over F3, RU 418, and DU 432 using SINR handovers. UE 401 and URLLC UPF 422 exchange user data over F3, RU 418, DU 432, and CU 441.

CU 441 notifies AMF 424 of the cell addition of RU 415 over F2 for UE 401. Over the N1, UE 401 instructs SMF 426 to activate the authorized eMBB slice. In response, SMF 426 selects eMBB bearer QoS and addressing for UE 401. SMF 426 selects and controls eMBB UPF 421 to serve the eMBB bearer to CU 441 per the eMBB QoS and addressing. AMF 424 controls CU 441 to serve the eMBB bearer between UE 401 and eMBB UPF 421 over F2, RU 415, and DU 432 using SINR handovers. UE 401 and eMBB UPF 421 now exchange user data over F2, RU 415, DU 432, and CU 441.

CU 441 notifies AMF 424 of the cell addition of RU 412 over F1 for UE 401. Over the N1, UE 401 instructs SMF 426 to activate the authorized mMTC slice. In response, SMF 426 selects mMTC bearer QoS and addressing for UE 401. SMF 426 selects and controls mMTC UPF 423 to serve the mMTC bearer to CU 441 per the mMTC QoS and addressing. AMF 424 controls CU 441 to serve the mMTC bearer between UE 401 and mMTC UPF 423 over F1, RU 412, and DU 431 using RSRP handovers. UE 401 and mMTC UPF 423 now exchange user data over F1, RU 412, DU 431, and CU 441.

Figure 9:
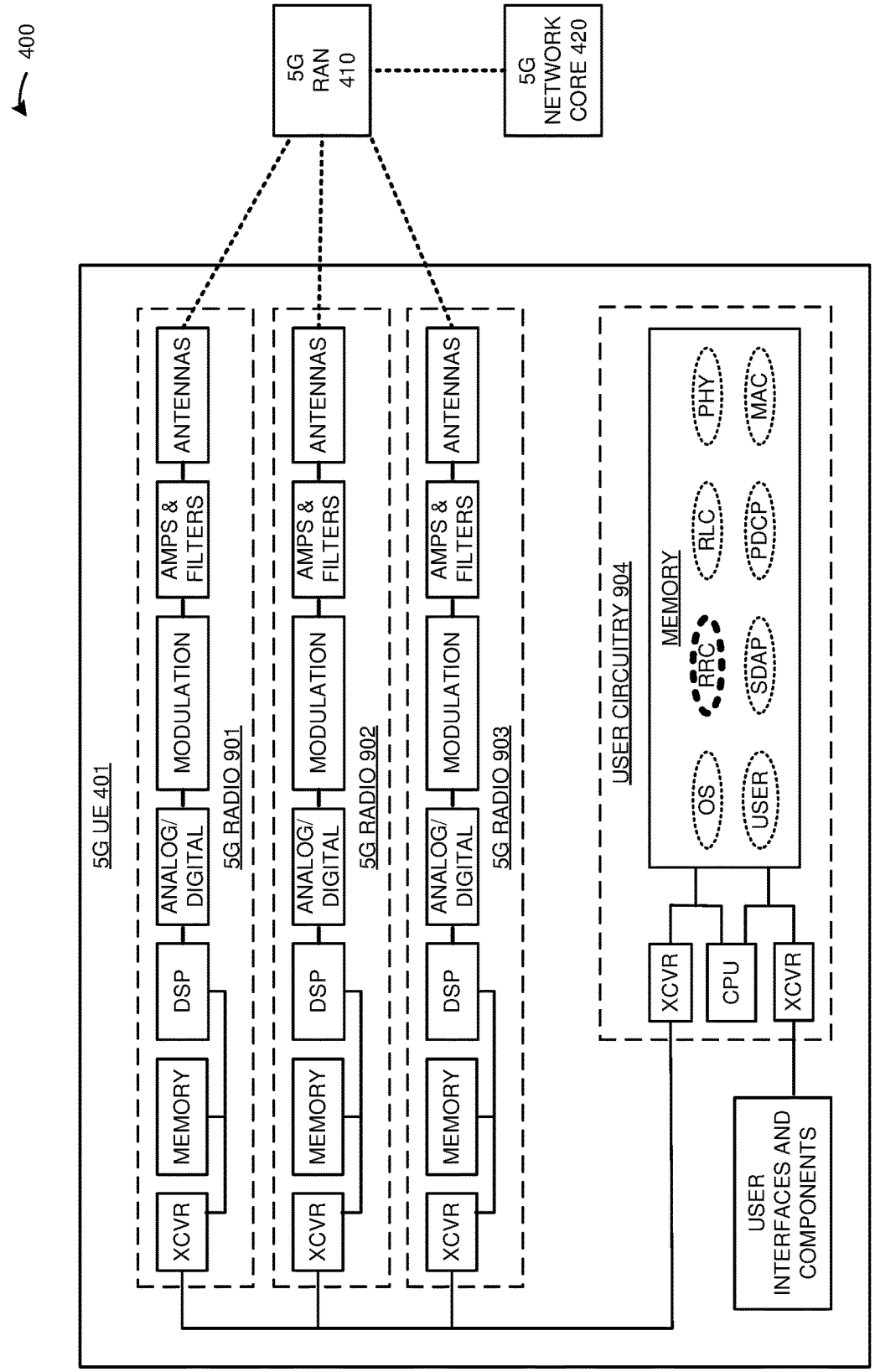
FIG. 9 illustrates the 5G UE that controls handover types for user applications.

FIG. 9 illustrates 5G UE 401 that controls handover types for user applications. UE 401 comprises an example of UE 101, although UE 101 may differ. UE 401 comprises 5GNR radios 901-903 and user circuitry 904. 5GNR radios 901-903 comprise antennas, amplifiers, filters, modulation, analog-to-digital interfaces, DSP, memory, and transceivers that are coupled over bus circuitry. User circuitry 904 comprises memory, CPU, user interfaces and components, and transceivers that are coupled over bus circuitry. The memory in user circuitry 904 stores an operating system, user applications (USER), and 5GNR network applications for PHY, MAC, RLC, PDCP, SDAP, and RRC. The antennas in 5GNR radios 901-903 are wirelessly coupled to 5G RAN 510 over frequency bands F1-F3. Transceivers in 5GNR radios 901-903 are coupled to a transceiver in user circuitry 904. A transceiver in user circuitry 904 is typically coupled to the user interfaces and components like displays, controllers, and memory. The CPU in user circuitry 904 executes the operating system, PHY, MAC, RLC, PDCP, SDAP, and RRC to exchange 5GNR signaling and data with 5G RAN 510 over 5GNR radios 901-903.

In 5GNR radios 901-903, the antennas receive wireless signals from 5G RAN 510 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency (F1-F3). The analog/digital interfaces convert the demodulated analog signals into digital signals for the DSPs. The DSPs transfer corresponding 5GNR symbols to user circuitry 904 over the transceivers. In user circuitry 904, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the low-latency user applications. The 5GNR network applications process the new uplink 5GNR signaling and low-latency user data to generate corresponding uplink 5GNR symbols that carry the uplink 5GNR signaling and data. In 5GNR radios 901-903, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency (F1-F3). The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

Based on signal strength detected by radio 901, the RRC in UE 401 wirelessly attaches to RU 411 in RAN 410 over F1 and exchanges attachment signaling with CU 441. The RRC in UE 401 reports UE capabilities for bands F1-F3 and for eMBB, URLLC, and mMTC slices to AMF 424 in network core 420 over 5G RAN 410. AMF 424 indicates authorized F1-F3 bands and authorized eMBB, URLLC, and mMTC slices to the RRC in UE 401 over 5G RAN 410.

UE 401 executes an augmented reality user application and selects the corresponding and authorized URLLC slice. In response to selecting the URLLC slice, the RRC in UE 401 selects F3 and SINR handovers by translating the URLLC slice type through a data structure into the F3 frequency band and SINR handover type. 5G radio 903 and the F3 PHY measure the SINR of RUs 416-418 in 5G RAN 410. The RRC transfers a cell reselection request for F3 and an F3 SINR report to CU 441. CU 441 selects RU 418 based on the best F3 SINR and directs the RRC in UE 401 to attach to RU 418 over F3. UE 401 attaches to RU 418 over F3. The RRC in UE 401 instructs SMF 426 over the N1 to activate the authorized URLLC slice. CU 441 signals the RRC in UE 401 to use the URLLC bearer over F3 and to use SINR handovers. The SDAP in UE 401 and URLLC UPF 422 now exchange URLLC user data over radio 903, F3, RU 418, DU 432, and CU 441. The RRCs in CU 441 and UE 401 perform SINR handovers for the URLLC slice.

UE 401 executes a video-conferencing application and selects the corresponding and authorized eMBB slice. In response to selecting the eMBB slice, the RRC in UE 401 selects F2 and SINR handovers by translating the eMBB slice type through a data structure into the F2 frequency band and SINR handover type. 5G radio 902 and the F2 PHY measure the SINR of RUs 413-415 in 5G RAN 410. The RRC transfers a cell addition request for F2 and an F2 SINR report to CU 441. CU 441 selects RU 415 based on the best F2 SINR and directs the RRC in UE 401 to attach to RU 415 over F2. UE 401 attaches to RU 415 over F2. The RRC in UE 401 instructs SMF 426 over the N1 to activate the authorized eMBB slice. CU 441 signals the RRC in UE 401 to use the eMBB bearer over F2 and to use SINR handovers. The SDAP in UE 401 and eMBB UPF 421 now exchange eMBB user data over radio 902, F2, RU 415, DU 432, and CU 441. The RRCs in CU 441 and UE 401 perform SINR handovers for the URLLC slice.

UE 401 executes an atmospheric sensor application and selects the corresponding and authorized mMTC slice. In response to selecting the mMTC slice, the RRC in UE 401 selects F1 and RSRP handovers by translating the mMTC slice type through a data structure into the F1 frequency band and RSRP handover type. 5G radio 901 and the F1 PHY measure the RSRP of RUs 411-412 in 5G RAN 410. The RRC transfers a cell addition request for F1 and an F1 RSRP report to CU 441. CU 441 selects RU 412 based on the best F1 RSRP and directs the RRC in UE 401 to attach to RU 412 over F1. UE 401 attaches to RU 412 over F1. The RRC in UE 401 instructs SMF 426 over the N1 to activate the authorized mMTC slice. CU 441 signals the RRC in UE 401 to use the mMTC bearer over F1 and to use RSRP handovers. The SDAP in UE 401 and mMTC UPF 423 now exchange mMTC user data over radio 901, F1, RU 415, DU 432, and CU 441. The RRCs in CU 441 and UE 401 perform RSRP handovers for the mMTC slice.

As UE 401 moves about, the RRC in UE 401 and CU 441 may perform SINR handovers for the URLLC slice over F3 from RU 418 to RUs 416-417 (or another RU or band). The RRC in UE 401 and CU 441 may perform SINR handovers for the eMBB slice over F2 from RU 415 to RU 413-414 (or another RU or band). The RRC in UE 401 and CU 441 may perform RSRP handovers for the mMTC slice over F1 from RU 412 to RU 411 (or another RU or band).

Figure 10:
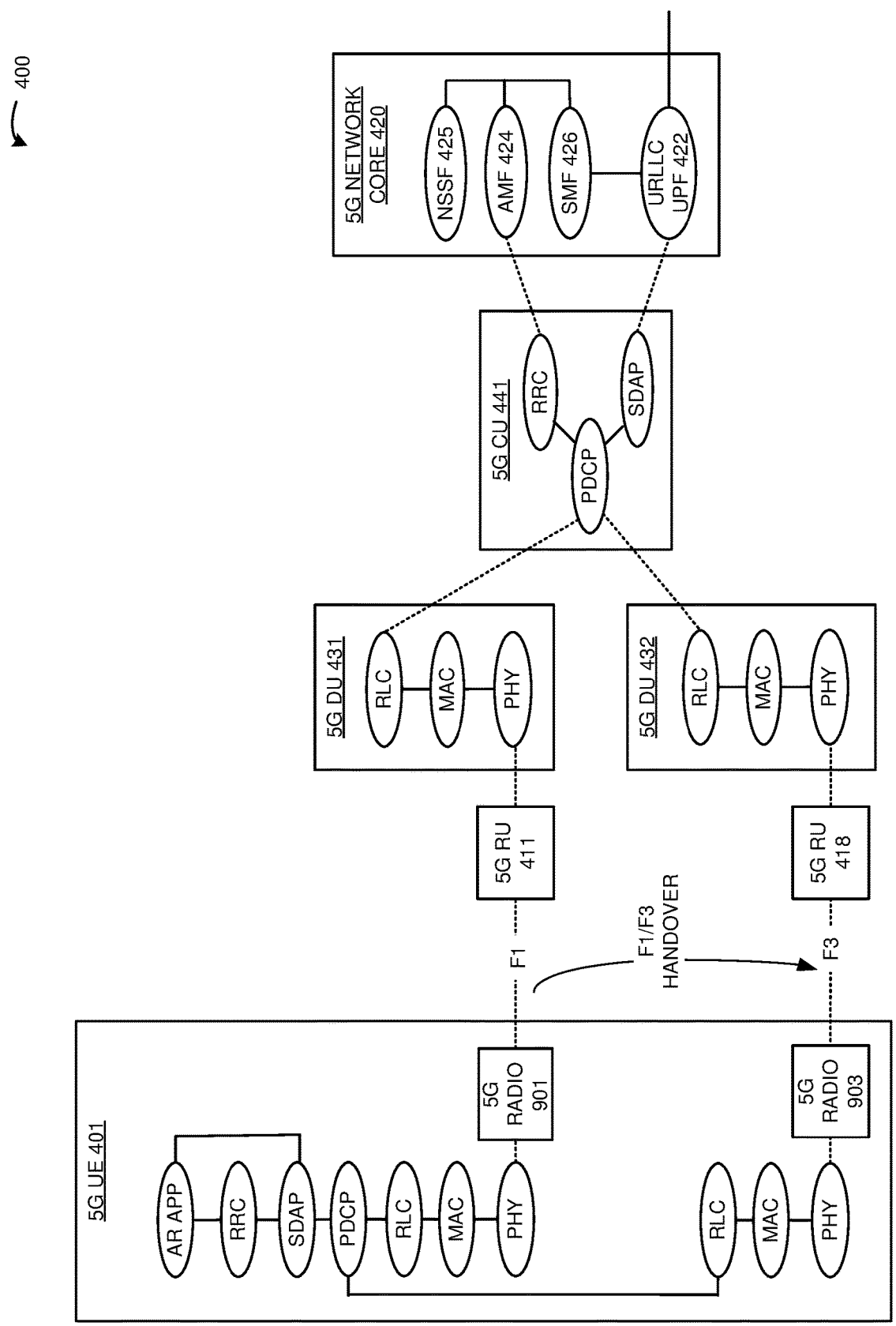
FIG. 10 illustrates the operation of the 5G communication network and the 5G UE to control handover types for user applications.

FIG. 10 illustrates the operation of 5G communication network 400 and 5G UE 401 to control handover types for user applications. The operation is exemplary and may vary in other examples. Based on signal strength, the RRC in UE 401 wirelessly attaches to and exchanges attachment signaling with the RRC in CU 441 over radio 901, F1, RU 411, and DU 431. The RRC in UE 401 reports UE capabilities for bands F1-F3 and for eMBB, URLLC, and mMTC slices to the RRC in CU 441 over radio 901, F1, RU 411, and DU 431. The RRC in CU 441 reports UE capabilities to AMF 424 over the N2. AMF 424 authorizes UE 401 for the F1-F3 bands. AMF 424 interacts with NSSF 425 to authorize UE 401 for the eMBB, URLLC, and mMTC slices responsive to the UE capability report. AMF 424 indicates authorized F1-F3 bands and authorized eMBB, URLLC, and mMTC slices to the RRC in UE 401 over: 1) the N1 through CU 441, DU 431, RU 411, F1, and radio 901; or 2) the N2 to the RRC in CU 441 and then over DU 431, RU 411, F1, and radio 901 to the RRC in UE 401.

UE 401 executes an augmented reality (AR) application and selects the corresponding and authorized URLLC slice. In response to selecting the URLLC slice, the RRC in UE 401 selects F3 and SINR handovers by translating the URLLC slice type through a data structure into the F3 frequency band and SINR handover type. The F3 PHY and radio 903 measure the SINR of RUs 416-418. Over radio 901, F1, RU 411, and DU 431, UE 401 transfers a cell reselection request for F3 and an F3 SINR report to the RRC in CU 441. The RRC in CU 441 selects RU 418 based on the best F3 SINR and directs the RRC in UE 401 to attach to RU 418 over F3. The RRC in CU 441 controls RU 418 and DU 432 to serve UE 401 over F3. The RRC in CU 441 notifies AMF 424 over the N2 of the cell reselection to RU 418 and F3. Over the N1 through RU 418, DU 432, and CU 441, UE 401 instructs SMF 426 to activate the authorized URLLC slice. In response, SMF 426 selects URLLC bearer QoS and addressing for UE 401. SMF 426 selects and controls URLLC UPF 422 to serve the URLLC bearer to the SDAP in CU 441 per the QoS and addressing. AMF 424 controls the RRC in CU 441 to serve the URLLC bearer between UE 401 and URLLC UPF 422 over F3, RU 418, and DU 432 using SINR handovers.

The RRC in CU 441 signals the applications in DU 432 and RU 418 to deliver the URLLC bearer over F3 per the URLLC QoS and addressing. The RRC in CU 441 signals the RRC in UE 401 over DU 432, RU 418, F3, and radio 903 to use the URLLC bearer over F3 and to use SINR handovers. The SDAP in UE 401 and URLLC UPF 422 now exchange URLLC user data over radio 903, F3, RU 418, DU 432, and CU 441.

The RRCs in CU 441 and UE 401 perform SINR handovers for the URLLC slice. In UE 401, the F3 PHY and radio 903 measure the SINR of RUs 416-418. The RRC reports the SINR measurements to the RRC in CU 441 over radio 903, F3, RU 418, and DU 432. The RRC in CU 441 initiates a handover of UE 401 to a target RU when the target RU has superior SINR. The RRC in UE 401 attaches to and exchanges signaling with the RRC in CU 441 over the target RU. The RRC in UE 401 may use the eMBB and mMTC slices and control their handover types in a similar manner.

The wireless data network circuitry described above comprises computer hardware and software that form special-purpose UE circuitry to use specific handover types for specific wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose UE circuitry to use specific handover types for specific wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to use different handover types for different user applications that are served by different wireless network slices, the method comprising:
   user circuitry executing a selected one of the user applications;
   network circuitry selecting one of the wireless network slices to serve the selected one of the user applications and selecting one of the handover types for the selected one of the wireless network slices;
   the user circuitry exchanging application data for the selected one of the user applications with the network circuitry; and
   the network circuitry exchanging the application data for the selected one of the user applications with the user circuitry, wirelessly exchanging the application data with a wireless communication network, and using the selected one of the handover types for the wireless exchange of the application data; and wherein:
   the wireless communication network uses the selected one of the handover types and the selected one of the wireless network slices to process the application data for the selected one of the user applications.

2. The method of claim 1 wherein the selected one of the handover types comprises a Signal-to-Interference Plus Noise Ratio (SINR) handover type.

3. The method of claim 1 wherein the selected one of the handover types comprises a Reference Signal Received Quality (RSRQ) handover type.

4. The method of claim 1 wherein the selected one of the handover types comprises a Reference Signal Received Power (RSRP) handover type.

5. The method of claim 1 wherein the selected one of the wireless network slices comprises an enhanced Mobile Broadband (eMBB) slice.

6. The method of claim 1 wherein the selected one of the wireless network slices comprises an Ultra-Reliable Low-Latency Communication (URLLC) slice.

7. The method of claim 1 wherein the selected one of the wireless network slices comprises a massive Machine Type Communication (mMTC) slice.

8. The method of claim 1 wherein:
   the selected one of the handover types comprises a Signal-to-Interference Plus Noise Ratio (SINR) handover type; and
   the selected one of the wireless network slices comprises an enhanced Mobile Broadband (eMBB) slice.

9. The method of claim 1 wherein:
   the selected one of the handover types comprises a Signal-to-Interference Plus Noise Ratio (SINR) handover type; and
   the selected one of the wireless network slices comprises an Ultra-Reliable Low-Latency Communication (URLLC) slice.

10. The method of claim 1 wherein:
    the selected one of the handover types comprises a Signal-to-Interference Plus Noise Ratio (SINR) handover type; and
    the selected one of the wireless network slices comprises a massive Machine Type Communication (mMTC) slice.

11. A wireless User Equipment (UE) to use different handover types for different user applications that are served by different wireless network slices, the wireless UE comprising:
    user circuitry that:
      executes a selected one of the user applications; and
      exchanges application data for the selected one of the user applications with network circuitry; and
    the network circuitry that:
      selects one of the wireless network slices to serve the selected one of the user applications and selects one of the handover types for the selected one of the wireless network slices; and
      exchanges the application data for the selected one of the user applications with the user circuitry, wirelessly exchanges the application data with a wireless communication network, and uses the selected one of the handover types for the wireless exchange of the application data; and wherein:
    the wireless communication network uses the selected one of the handover types and the selected one of the wireless network slices to process the application data for the selected one of the user applications.

12. The wireless UE of claim 11 wherein the selected one of the handover types comprises a Signal-to-Interference Plus Noise Ratio (SINR) handover type.

13. The wireless UE of claim 11 wherein the selected one of the handover types comprises a Reference Signal Received Quality (RSRQ) handover type.

14. The wireless UE of claim 11 wherein the selected one of the handover types comprises a Reference Signal Received Power (RSRP) handover type.

15. The wireless UE of claim 11 wherein the selected one of the wireless network slices comprises an enhanced Mobile Broadband (eMBB) slice.

16. The wireless UE of claim 11 wherein the selected one of the wireless network slices comprises an Ultra-Reliable Low-Latency Communication (URLLC) slice.

17. The wireless UE of claim 11 wherein the selected one of the wireless network slices comprises a massive Machine Type Communication (mMTC) slice.

18. The wireless UE of claim 11 wherein:
the selected one of the handover types comprises a Signal-to-Interference Plus Noise Ratio (SINR) handover type; and
the selected one of the wireless network slices comprises an enhanced Mobile Broadband (eMBB) slice.

19. The wireless UE of claim 11 wherein:
the selected one of the handover types comprises a Signal-to-Interference Plus Noise Ratio (SINR) handover type; and
the selected one of the wireless network slices comprises an Ultra-Reliable Low-Latency Communication (URLLC) slice.

20. The wireless UE of claim 11 wherein:
the selected one of the handover types comprises a Signal-to-Interference Plus Noise Ratio (SINR) handover type; and
the selected one of the wireless network slices comprises a massive Machine Type Communication (mMTC) slice.

* * * * *